United States Patent [19]

Lipman et al.

[11] Patent Number: 4,497,582

[45] Date of Patent: Feb. 5, 1985

[54] PLANETARIUM ALARM CLOCK

[76] Inventors: Abby G. Lipman, 26 Cypress Pl., Sausalito, Calif. 94965; Herbert L. Levin, 215 Fox Hill Rd., Needham, Mass. 02192

[21] Appl. No.: 438,043

[22] Filed: Jul. 27, 1983

[51] Int. Cl.³ .............................................. G04B 19/26
[52] U.S. Cl. ........................................ 368/15; 368/72; 434/287
[58] Field of Search ............................. 368/10, 15–18, 368/20, 223; 434/285–289

[56] References Cited

U.S. PATENT DOCUMENTS

| | | | |
|---|---|---|---|
| 2,230,039 | 1/1941 | Jones | 368/15 |
| 2,366,470 | 1/1945 | Annis | 434/287 |
| 3,248,866 | 5/1966 | Spilhaus | 368/19 |
| 3,766,727 | 10/1973 | Didik | 368/15 |

Primary Examiner—Vit W. Miska

[57] ABSTRACT

A hemispherical dome of opaque thin material is pierced with small openings in patterns conforming to the appearance of constellations in the sky. Mounted on a rotating cylinder, the dome is turned by an electric motor at adjustable speeds. A light source within the dome casts patterns of the constellations about the room. The control for the motor is wired into an alarm clock so that the speed of rotation may simulate the earths rotation. Turning the alarm on may activate the planetarium upon awakening the user. A "sleep cycle" on the alarm may operate the planetarium for a specified period before turning off automatically allowing the user to fall asleep with the planetarium activated. Opaque mask hemispheres which fit snugly over the planetarium dome are each provided with a single cut-out portion shaped to expose only one constellation at a time for projection. Light bulbs with variously shaped filaments will project the shape of each filament into the room.

19 Claims, 3 Drawing Figures

PLANETARIUM ALARM CLOCK

DESCRIPTION

1. Technical Field

My invention relates to celestial learning tools or planetariums and in particular to a small planetarium which is time condition responsive in conjunction with an alarm clock.

2. Background Art

Most planetariums are very large complex systems housed in institutions such as science museums, and require a special trip to the location and a special program to learn about celestial bodies.

Other small planetariums are provided as special learning tools often with special hemispherical screens for viewing. They are not integrated into the normal every-day life of the child.

None of the prior art planetariums provide a means for relaxed subliminal learning of celestial systems.

None of the small planetariums provide a means to project any single selected constellation of stars in isolation.

None of the prior art planetariums serve additional functions beyond their use as a celestial learning tool.

DISCLOSURE OF INVENTION

The present invention provides a small portable planetarium built into an alarm clock unit which may be used in any room and, in particular in the bedroom, of a house to provide for informal learning of astronomy in a child's own environment.

By combining a planetarium with an alarm clock, the learning of astronomy becomes a casual effortless part of a child's everyday life integrated into normal routine in conjunction with this common device.

During the times just prior to falling asleep and just after awakening the mind is particularly receptive to subliminal learning because of the relaxed state characteristic of those times. By providing a planetarium which is activated during the timed automatic-shut-off sleep cycle and during the wake-up alarm cycle of an alarm clock, optimum advantage is taken for relaxed subliminal learning with the device.

Learning of celestial configurations is further enhanced by providing masks to isolate a single constellation for display at one time, thereby affording the opportunity to focus attention on and learn each constellation one by one.

By providing a small planetarium integrated into the home environment projecting the celestial configurations around the room, additional advantages are provided. The rotating lights serve as a soft environmental night light, a baby pacifier or a natural visual mobile.

BRIEF DESCRIPTION OF THE DRAWINGS

These and other details and advantages of my invention will be described in connection with the accompanying drawings, which are furnished only by way of illustration and not in limitation of the invention, and in which drawings.

BEST MODE OF CARRYING OUT THE INVENTION

Figure 1:
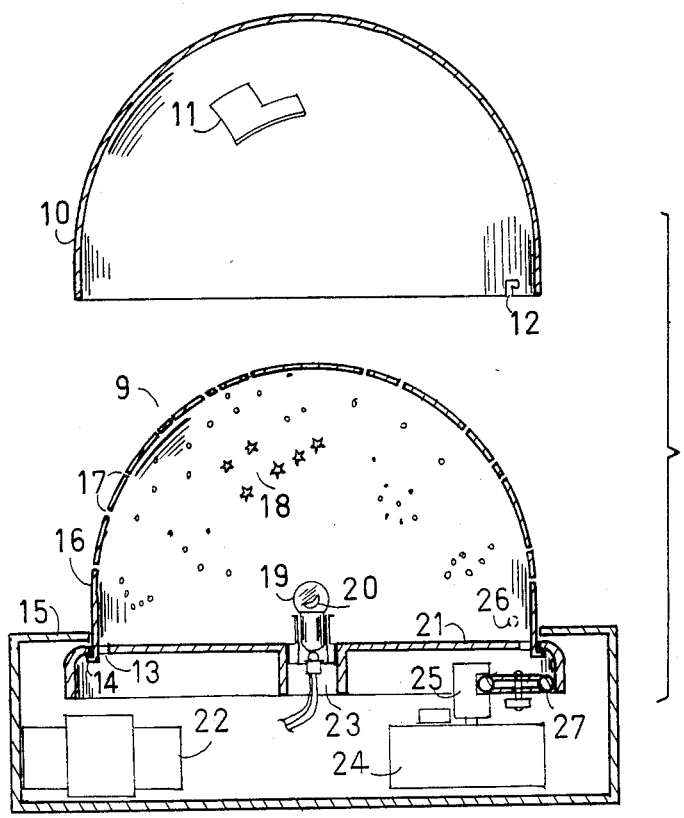
FIG. 1 is an elevational view of the invention with the planetarium and mask shown in cross-section.
Figure 2:
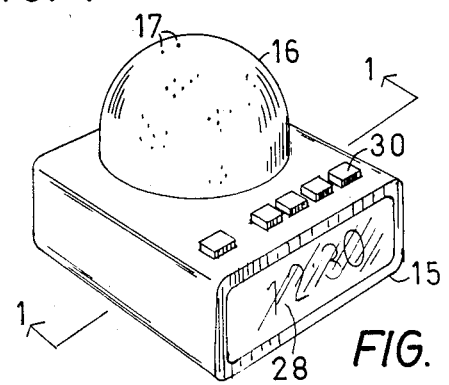
FIG. 2 is a perspective view of the planetarium alarm clock.

In FIGS. 1 and 2, the planetarium 9 is encased at 15 with the workings of an alarm clock which may be a clock radio, with time readout 28 (digital in this case) and control switches 30.

The planetarium comprises a lower casing 15 which houses a transformer 22 and an electric motor 24 with gears 25 to turn a high-friction drive wheel 27 (rubber) which causes the dome turntable 21 to rotate upon activation of the motor. Mounted at the center of the turntable on a central shaft 23 is the light source 19 which in this case comprises an incandescent bulb with a filament 20.

A hemispherical dome 16 is secured to the top of the turntable by inserting tabs 14 with outward protrusions through slots 13 near the edge of the turntable. The dome is fabricated of a thin rigid material such as a light metal or plastic which is opaque to prevent the passage of light therethrough. Perforations 17 are made through the thickness of the dome to allow light to pass only through the perforations, which may be drilled circular holes or stamped shapes such as stars. The perforations are positioned around the dome in patterned groupings to simulate the shapes of the constellations of stars as they appear from earth, such as the Big Dipper 18 which appears in the Northern Hemisphere. When activated the light 19 shines through the perforations outward into the room in which the planetarium is located to project images of the constellations on walls, ceilings and any objects in the path of the light.

The shape of the image projected is affected by the shape of the light source. If a moon-shaped filament casts light through the perforations inverted moon-shaped images will be projected.

A hemispherical mask 10 slightly larger in diameter than the dome 16 may be secured over the dome by some removable means such as a pin 26 protruding from the dome inserted within an L-shaped slot 12 on the mask. The mask is opaque with a single patterned opening 11 in the shape of one of the constellations (Big Dipper in this case) to allow only the light passing through the perforations of that constellation to be projected into the room, thereby permitting the study of one constellation at a time.

Rotation of the planetarium further enhances the simulative effect of the stars as they appear in the sky with the rotation of the earth. The speed of the rotation may be varied from a very slow speed tied directly to the passing of time on the clock to simulate the earth's rotation to a much faster speed for visual interest or to aid in displaying the constellations for study.

Figure 3:
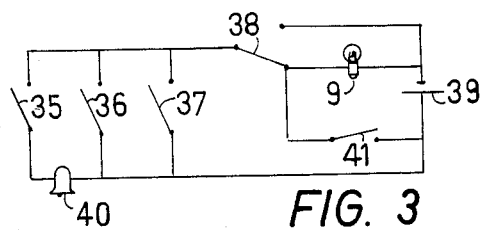
FIG. 3 is a diagrammatic view of the switching circuitry of the invention.

In FIG. 3 the various switching possibilities are indicated for connecting to the power source 39 to activate the planetarium. When the planetarium tie-in switch 38 is connected, activating either the alarm switch 35, the sleep switch 36, or the on/off switch 37 will activate the planetarium. By disconnecting the tie-in switch 38 the alarm 40 may be operated independently of the planetarium 9 by planetarium switch 41.

It is understood that the preceding description is given merely by way of illustration and not in limitation of the invention and that various modifications may be made thereto without departing from the spirit of the invention as claimed.

I claim:

1. A planetarium comprising:

an opaque hemispherical dome surface provided with patterned groupings of perforations therethrough in configurations resembling the apparent positions of constellations of stars from earth;

a lighting means centrally located within the hemisphere to shine light through the perforations thereby projecting images of the constellations about a room in which the planetarium is located;

at least one opaque hemispherical mask which fits snugly over the hemispherical dome and which mask is provided with a patterned opening therethrough to allow the lights of one constellation to be projected through the mask at a time;

a timed means for rotating the hemisphere.

2. The invention of claim 1 wherein the timed means of rotating the hemisphere is an electric motor wired into an alarm clock.

3. The invention of claim 2 wherein the planetarium is lighted upon activation of the alarm at a desired preset time to serve as a moving light source to awaken a person sleeping in the room.

4. The invention of claim 2 wherein the alarm clock is provided with a timed automatically switched off cycle, or "sleep cycle", during which the planetarium is activated to act as a gentle night light before a person in the room falls asleep and the switch turns off automatically.

5. The invention of claim 1 wherein the speed of rotation of the planetarium is adjustable.

6. The invention of claim 5 wherein the speed of rotation of the planetarium is timed to simulate the actual rotation of the earth and the planetarium serves as a learning tool for astronomy.

7. The invention of claim 1 wherein a series of hemispherical masks is provided, each mask having a uniquely patterned and positioned opening to reveal a different constellation from those revealed by other masks.

8. The invention of claim 1 wherein each light image is projected in a particular shape.

9. The invention of claim 8 wherein the shape of the projected light is formed by providing the lighting means in a desired shape.

10. The invention of claim 9 in which the lighting means is an incandescent light provided with a filament of a desired shape to be projected.

11. A planetarium comprising:

an opaque hemispherical dome surface provided with patterned groupings of perforations therethrough in configurations resembling the apparent positions of constellations of stars from earth;

a lighting means centrally located within the hemisphere to shine light through the perforations thereby projecting images of the constellations about a room in which the planetarium is located;

a motorized means for rotating the hemisphere connected with the control of an alarm clock;

a removable means for blocking the passage of light through some perforations in the hemispherical surface.

12. The invention of claim 11 wherein the removable light blocking means comprises an opaque hemispherical mask provided with a patterned opening, which mask fits snugly over the hemispherical dome surface to block the majority of the perforations and which mask admits light only through the patterned opening to display at least one constellation.

13. The invention of claim 11 wherein each light image is projected in a particular shape.

14. The invention of claim 13 wherein the shape of the projected light is formed by providing the lighting means in a desired shape.

15. The invention of claim 14 in which the lighting means is an incandescent light provided with a filament of a desired shape to be projected.

16. The invention of claim 11 wherein the planetarium is lighted upon activation of the alarm at a desired preset time to serve as a moving light source to awaken a person sleeping in the room.

17. The invention of claim 11 wherein the alarm clock is provided with a timed automatically switched off cycle, or "sleep cycle", during which the planetarium is activated to act as a gentle night light before a person in the room falls asleep and the switch turns off automatically.

18. The invention of claim 11 wherein the rotation of the planetarium is adjustable.

19. The invention of claim 18 wherein the speed of rotation of the planetarium is timed to simulate the actual rotation of the earth and the planetarium serves as a learning tool for astronomy.

* * * * *